INVENTOR.
Clifford Curtis

United States Patent Office 3,122,188
Patented Feb. 25, 1964

3,122,188
JUICE EXTRACTOR FOR VEGETABLES AND FRUITS
Clifford Curtis, 2842 N. Orchard St., Chicago, Ill.
Filed Jan. 28, 1963, Ser. No. 254,306
8 Claims. (Cl. 146—76)

This invention is directed to electrically driven portable devices for extracting juice from fruits and vegetables and for pulverizing or comminuting the same.

Important objects of my invention are:

(a) To provide a portable device for extracting juice from vegetables or the like, which has power driven means for pumping and moving air into the area of the strainer or sieve and in preventing clogging thereof by fibres and pieces of the vegetables or fruits.

(b) To provide a portable device which has a removably mounted apertured brush mounted adjacent the perforated strainer, and means for conveying blown air through said brush onto the strainer to aid in keeping the strainer unclogged and in fully operative condition.

(c) To provide a pair of removably mounted apertured brushes normally engaging the opposite sides of the strainer of a driven juice extractor, and means for introducing driven air through at least one of said brushes.

(d) To provide a device having a rotatably mounted and driven cutting and comminuting blade which has means for maintaining the rotation of said blade at substantially constant speeds regardless of the pressure and friction of the material pressed into engagement with said blade, said means including two separate journalled shafts and slidable connected means including a spring for returning one of said shafts and said blade to normal upper position, and including a resistor and an electrical circuit means connecting said resistor, a switch, and an electric motor whereby said resistor will be by-passed when said blade and one of said shafts are moved to close said switch.

(e) To provide a portable juice extractor and pulverizing device in which the driven vegetable engaging member is mounted for limited vertical movement and which has spring means for returning the same to original position upwardly, after said member is depressed, and which has an electrical current resistor and circuit and switch means which, when the vegetable-engaging member is depressed, will disconnect said resistor and cause the current to by-pass such resistor to accelerate the rotation of said vegetable-engaging member and avoid a slowing down of rotation when the friction on said rotatable member is increased.

Other and further important objects of my invention will be apparent from the following description and appended claims.

Figure 1:
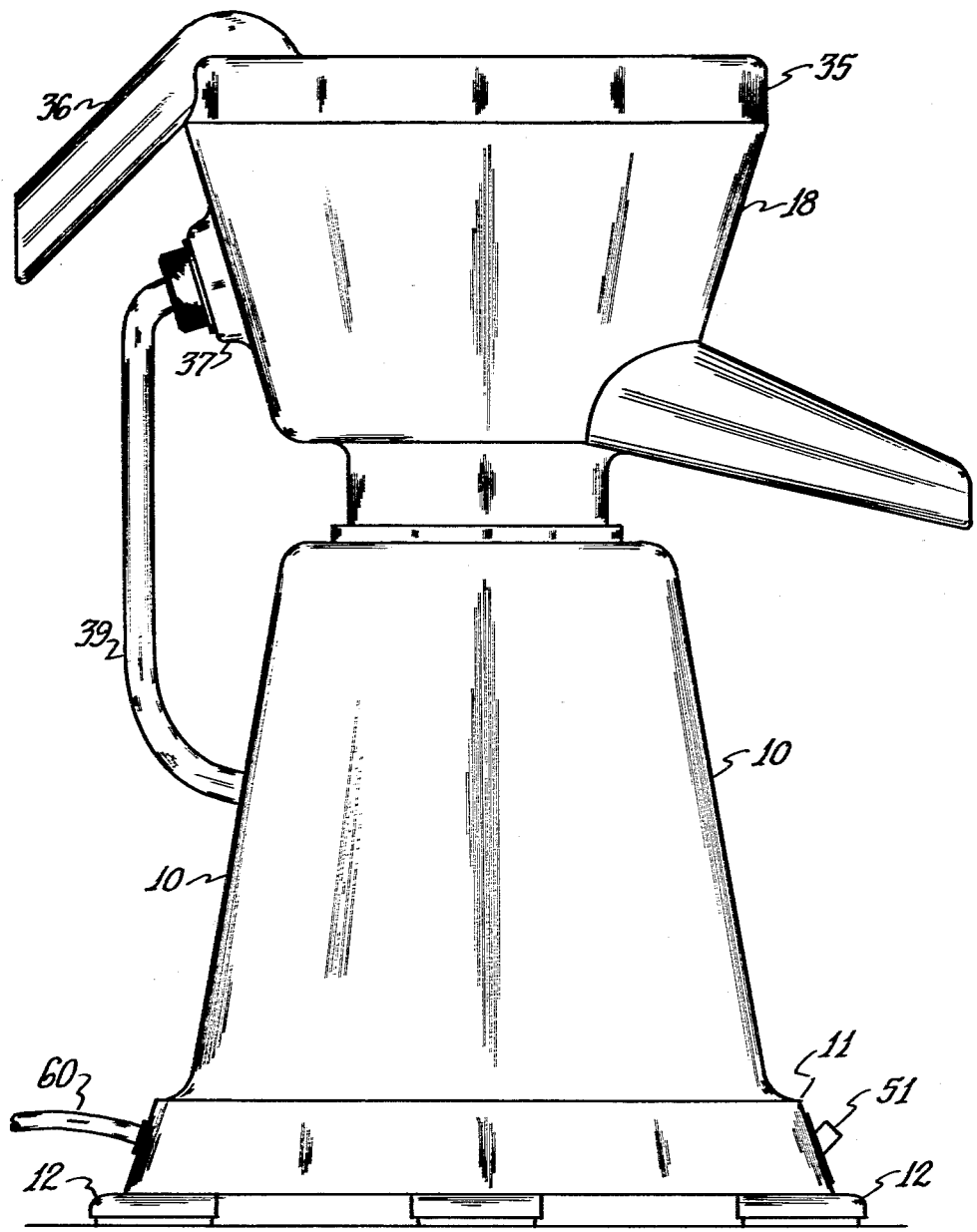
FIG. 1 is a side elevational view of my novel electrically driven juice extractor and pulverizer.

Numeral 10 designates an outer supporting metal casing having an integral apertured base flange 11 to which a plurality of pads or feet 12 are suitably secured. The upper end portion of casing 10 is reduced to form an integral annular neck 14 opening upwardly. Said neck 14 has an integral inwardly extending web or flange 15 forming a bearing 16 in which a cylindrical coupling 26 is journalled.

A metal hopper or receptacle 18 having a depending integral annular flange 19 is snugly though removably mounted on neck 14. Said hopper 18 has an outwardly extending discharge spout 20 integral therewith, and has an upper inwardly extending integral flange 21 defining a large upper opening.

Numeral 22 designates an electric motor suitably secured within the casing 10 which has a cylindrical head member 23 secured on the upper end of its armature shaft 24. A stud 25 is secured in the side of member 23, as shown in FIG. 3.

A metal cylindrical coupling 26 having an end slot 27 has its lower portion slidably mounted for vertical movement about member 23 and has an internally threaded hole 28 formed in its upper end and at its upper end is journalled in the bearing formed by flange 16. Said coupling 26 is mounted in the inner face of a ball bearing 29, which said bearing rotates with said shaft.

Said slidable coupling 26 always maintains a driving or power transmission connection between the motor shaft and the rotor 30. Said slidable coupling 26 and stud 25, in cooperation with an expansion spring 37 mounted about coupling 26, represents one form of releasable clutch members or slidable connections which may assume other equivalent forms. Said spring 37 is suitably supported and its upper end bears against the inner race of bearing 29 to normally hold the rotor in an upper position.

A corrugated or grooved grinding and pulverizing member hereinafter referred to as a rotor 30, has an upper corrugated face 31 and an integral depending externally threaded stud 32 which is removably threaded in the upper threaded end of stub shaft 26. Rotor 30 has an annular groove in which a sealing O ring 33 is mounted to form a tight seal with neck 14.

A funnel member 34 having a curved peripheral flange 35 is removably mounted on the upper periphery of hopper 18 and carries a downwardly inclined passaged chute or spout 36 which partially overlies the periphery of said hopper. The lower discharge portion of funnel member 34 is of a size substantially smaller than the upper corrugated face 31 of rotor 30, as illustrated in FIG. 2.

Figure 2:
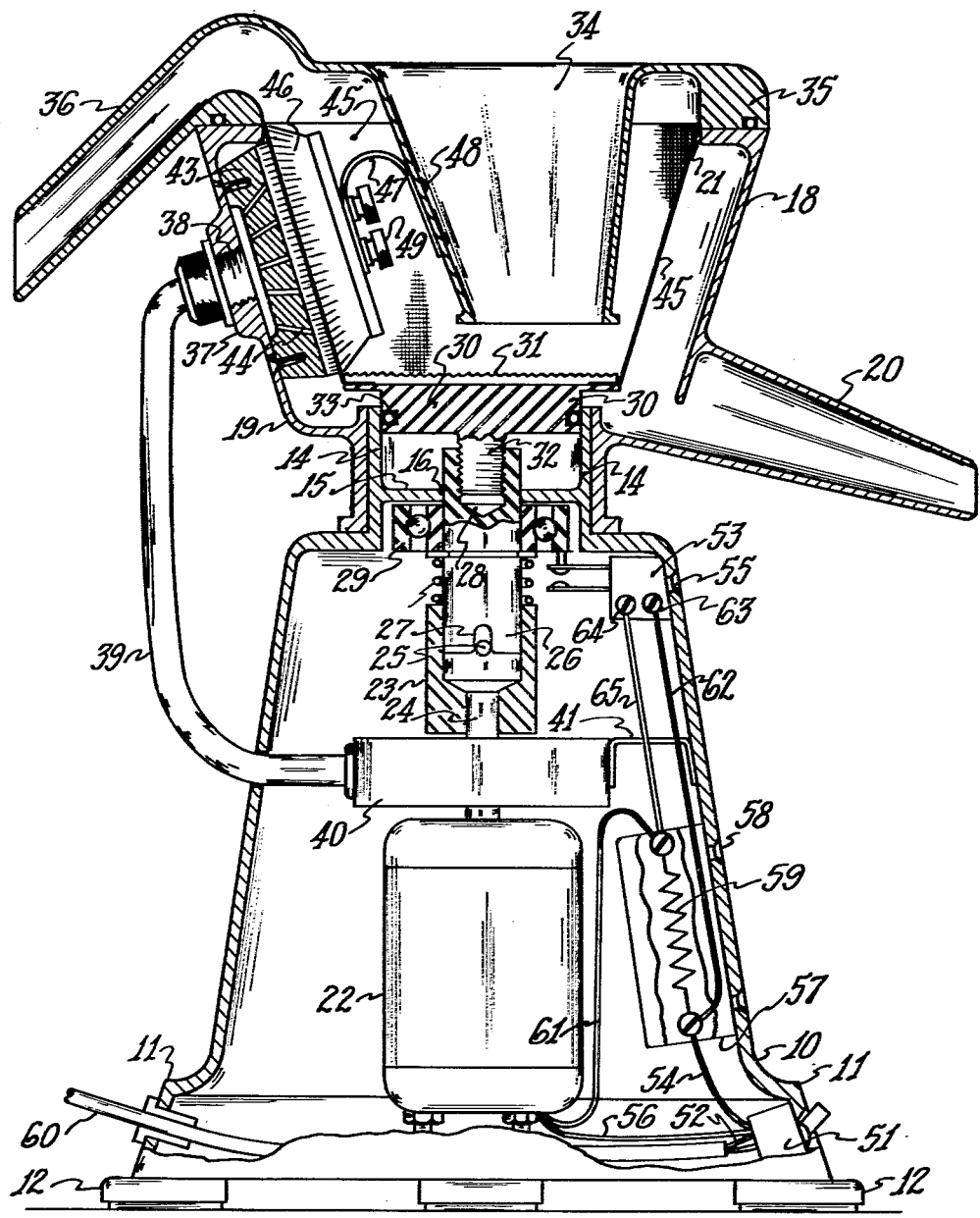
FIG. 2 is a cross-sectional view taken on a vertical plane through the center of said device and showing various interior parts in cross section.

As shown at the left of FIG. 2, the side wall of hopper 19 has an internally threaded boss 37 in which one threaded end of a knurled metal connection nipple 38 is threaded. A curved metal tube 39 connects said nipple to the discharge port of an air pump 40 which is mounted by means of bracket 41 to the side wall of casing 10 and whose impeller (not shown) is mounted about and suitably connected to and driven by armature shaft 24.

An apertured metal mounting plate 42 has its aperture internally threaded and adjustably and removably mounted on the inner end of nipple 38. Said plate 42 has secured to it the rigid back of a bristle brush 43, which back has a plurality of passages 44 therein which communicate with the passage through nipple 38.

Numeral 45 designates a metal frusto-conical sieve or strainer whose lower edge removably seats about the periphery rotor 30. The bristles of brush 44 normally slidably engage the outer surface of strainer 45 to aid in continuous removal of fibres and pieces of the vegetables which are finely divided and pulverized by the action of the driven rotating rotor 30 to thereby prevent clogging of the holes in said strainer so that juices may freely flow through same into the outer portions of the hopper 18 and out through spout 20.

At the time of operation the air forced by pump 40, through tube 39 and through the passages of the brush, will force a substantial part of the fibres and pieces of the vegetables from the holes in said strainer 45.

One or more additional brushes may be employed to aid in the removal of fibres and pieces from the holes in strainer 45. Inner bristle brush or scraper 46 has its rigid back connected to the inclined wall of the funnel member 34 by means of a bracket-like spring 47, one leg of which is secured by rivets 48 to said funnel member. Said brush preferably has a pair of threaded studs 49 mounted in its rigid back which studs are threadingly connected in holes or slots formed in the other leg of said spring 47, as illustrated in FIG. 2. Suitable spacers may be mounted between the back of said brush 46 and said spring 47 whereby said brush is adjustably mounted.

I desire it to be understood that the described means for slidably connecting the vegetable-engaging rotor and the driven armature shaft represents a preferred form and which may be varied to other equivalent connecting means providing for normally vertical movement and for actuation or closing of an auxiliary circuit switch, which closing results in current by-passing or avoiding the resistor or transformer unit.

It is to be understood that when vegetables or fruits are depressed against the rough face of the rotor or equivalent comminuting element, the resulting increased friction thereof would normally reduce the speed of rotation of the motor and of the rotor. The operation of my device results in cutting the resistor out of the electric supply circuit to the motor so that the increased power will compensate for and overcome said increased friction to cause the continued substantially uniform normal speed of the rotor with resulting normal comminuting of the vegetable or fruit mass.

Numeral 51 represents a conventional electrical hand toggle switch connectable by two circuit wires, indicated by numeral 52, to an electrical power source. Circuit wire 54 connects said switch to the terminals of an auxiliary by-pass switch 53 secured by a screw 55 to the side wall of casing 10, as shown in FIG. 2. Wire 56 is connected to a terminal of resistor 57 secured by screws 58 to casing 10.

The electrical cord designated as 60 in the lower part of FIG. 2 contains two separate wires which are contactable in the usual manner to an electrical supply plug. Numeral 51 designates a manually operated control switch which is interposed in one of said power source wires. A wire 54 electrically connects one terminal of switch 51 to one terminal of a resistance coil 59 within the housing, generally designated as 57. The upper and opposite terminal of the said resistance coil 59 is connected by a wire 61 to one terminal of the electric motor 22.

An electrical wire 62 connects the lower terminal of the resistance coil 57 and the other terminal 63 of the auxiliary switch 53. The other terminal 64 of the switch 53 is connected by a wire 65 to wire 61.

In normal operation with the rotor and strainer in upper position, the current will flow from the power source through switch 51, through wire 54 and through the resistance coil 57 and through wire 61 to the electric motor. Another wire 63 connects the power source plug with one terminal of the electric motor. Accordingly, the current will flow through the resistor 57 so that a reduced though normal speed of rotation of the rotor 30 is effected.

When the work load of the rotor 30 is increased by the frictional engagement of vegetables or the like and when the rotor 30 is lowered to cause a closing of the auxiliary switch 53, the current will by-pass the resistor 57, and flow directly through the manual switch, through wires 54 and 64 and through closed switch 53 to the terminal of the electric motor.

I claim:

1. In a device for extracting juice from vegetables or the like;
   a supporting casing;
   a hopper mounted on said casing having a discharge spout;
   a rotor mounted for rotation in said hopper, said rotor having an upper uneven face;
   an electric motor mounted in said casing;
   said motor having an upwardly extending armature shaft;
   a releasable clutch means for drivingly connecting the armature of said motor and said rotor;
   a funnel member mounted to extend into said hopper;
   said rotor being mounted for limited vertical movement relative to said casing;
   an auxiliary electrical switch mounted in said casing;
   an electrical resistor mounted in said casing;
   circuit wires connecting said resistor, said motor and said auxiliary switch;
   the downward movement of said rotor and said means being adapted to operate said auxiliary switch to directly connect said motor with a current supply source and to by-pass said resistor;
   a strainer removably mounted in said hopper above said rotor;
   a passaged brush mounted in said hopper and normally engaging said strainer;
   an air pump operatively connected to said motor;
   and a pipe connecting the interior of said hopper and said brush and said air pump.

2. In a device for extracting juice from vegetables or the like;
   a supporting casing;
   a hopper mounted on said casing having a discharge spout;
   a rotor mounted for rotation and for slidable movement in said hopper, said rotor having an upper uneven rough face;
   an electric motor mounted in said casing;
   said motor having an upwardly extending armature shaft;
   means operatively connecting the armature shaft of said motor and said rotor;
   a funnel member mounted to extend into said hopper;
   an auxiliary electrical switch mounted in said casing;
   an electrical resistor mounted in said casing;
   circuit wires connecting said resistor, said motor and said auxiliary switch and adapted to be connected to an electrical source, means actuable by movement of said rotor for actuating said switch;
   the downward movement of said rotor being adapted to operate said auxiliary switch to cause current to by-pass said resistor;
   a strainer removably mounted in said hopper above said rotor;
   and a brush adjustably mounted in said hopper and normally engaging said strainer.

3. A device as recited in claim 2 and having a second brush adjustably mounted and connected to said funnel member and normally engaging the inside of said strainer.

4. A device as recited in claim 1 and having a second brush mounted adjacent to the inside of said strainer.

5. In a device for extracting juice from vegetables or the like;
   a supporting casing;
   a hopper mounted on said casing having a discharge spout;
   a rotor mounted for rotation in said hopper, said rotor having an upper uneven face;
   an electric motor mounted in said casing;
   said motor having an upwardly extending armature shaft;
   a releasable clutch means for drivingly connecting the armature shaft of said motor and said rotor;
   a funnel member mounted to extend into said hopper;
   said rotor being mounted for limited vertical movement relative to said casing;
   an auxiliary electrical switch mounted in said casing;
   an electrical resistor mounted in said casing;
   circuit wires connecting said resistor, said motor and said auxiliary switch;
   the downward movement of said rotor and said means being adapted to operate said auxiliary switch to directly connect said motor with a current supply source and to by-pass said resistor;

a strainer removably mounted in said hopper above said rotor;

a brush mounted in said hopper and normally engaging said strainer;

air blowing means operatively connected to the shaft of said motor;

and pipe means for conducting air from said blowing means to the area of said brush.

6. A device as recited in claim 2, and in which said means connecting the motor armature shaft and said rotor includes a connection coupling slidably mounted and a projecting bearing adapted to engage and close said switch on downward movement of said rotor, and a spring for returning said rotor and coupling to upper position.

7. In a portable device for pulverizing and extracting juice from fruits or the like, a metal housing having a reduced neck portion;

a motor mounted in said housing having an upwardly extending shaft;

an air pump operatively connected to said shaft;

an upper hopper mounted on said neck;

a rough surfaced rotor rotatably and slidably mounted relative to said hopper and having a foraminous strainer and a discharge opening;

a slidable stub shaft slidably and rotatably connected to said shaft of said motor;

an electric switch connected to the side of said housing;

a projecting member on said stub shaft and adapted to close said switch on downward movement thereof;

a spring for returning said stub shaft and rotor to upper position;

a resistor electrically connected to said switch and to said motor;

the depression of said rotor being adapted to close said switch to disconnect said resistor from the circuit of said motor to cause said motor to rotate said rotor at increased or constant speeds and to overcome friction of fruits held in engagement with said rotor;

and an air tube connecting said pump and said hopper.

8. In a portable device for pulverizing and extracting juice from vegetables or the like, a metal housing having a reduced neck portion;

a motor mounted in said housing having an upwardly extending shaft;

an upper hopper mounted on said neck;

a rough surfaced rotor rotatably mounted in said hopper;

a slidable stub shaft slidably and rotatably connected to said shaft of said motor;

a foraminous strainer having a discharge opening and mounted on said rotor;

an electric switch connected to the side of said housing;

a projecting member on said stub shaft and adapted to close said switch on downward movement thereof;

and a spring for returning said stub shaft and rotor to upper position;

and a resistor electrically connected to said switch and to said motor;

the depression of said rotor and stub shaft being adapted to close said switch to disconnect said resistor from the circuit of said motor to cause said motor to rotate said rotor at increased speeds or at constant speed and to overcome friction of vegetables held in engagement with said rotor.

References Cited in the file of this patent
UNITED STATES PATENTS

| | | |
|---|---|---|
| 2,078,604 | Gage et al. | Apr. 27, 1937 |
| 2,513,519 | Reynolds | July 4, 1950 |
| 3,094,882 | Roberts | June 25, 1963 |
| 3,101,107 | Posener et al. | Aug. 20, 1963 |